Dec. 27, 1960 A. J. KIZAUR 2,966,588
X-RAY APPARATUS
Original Filed Dec. 15, 1952 7 Sheets-Sheet 1

INVENTOR:—
ARTHUR J. KIZAUR
BY:—
Junius F. Cook, Jr.
ATTORNEY.

Dec. 27, 1960  A. J. KIZAUR  2,966,588
X-RAY APPARATUS
Original Filed Dec. 15, 1952  7 Sheets-Sheet 2

ARTHUR J. KIZAUR
BY:—
Junius F. Cook Jr.
ATTORNEY.

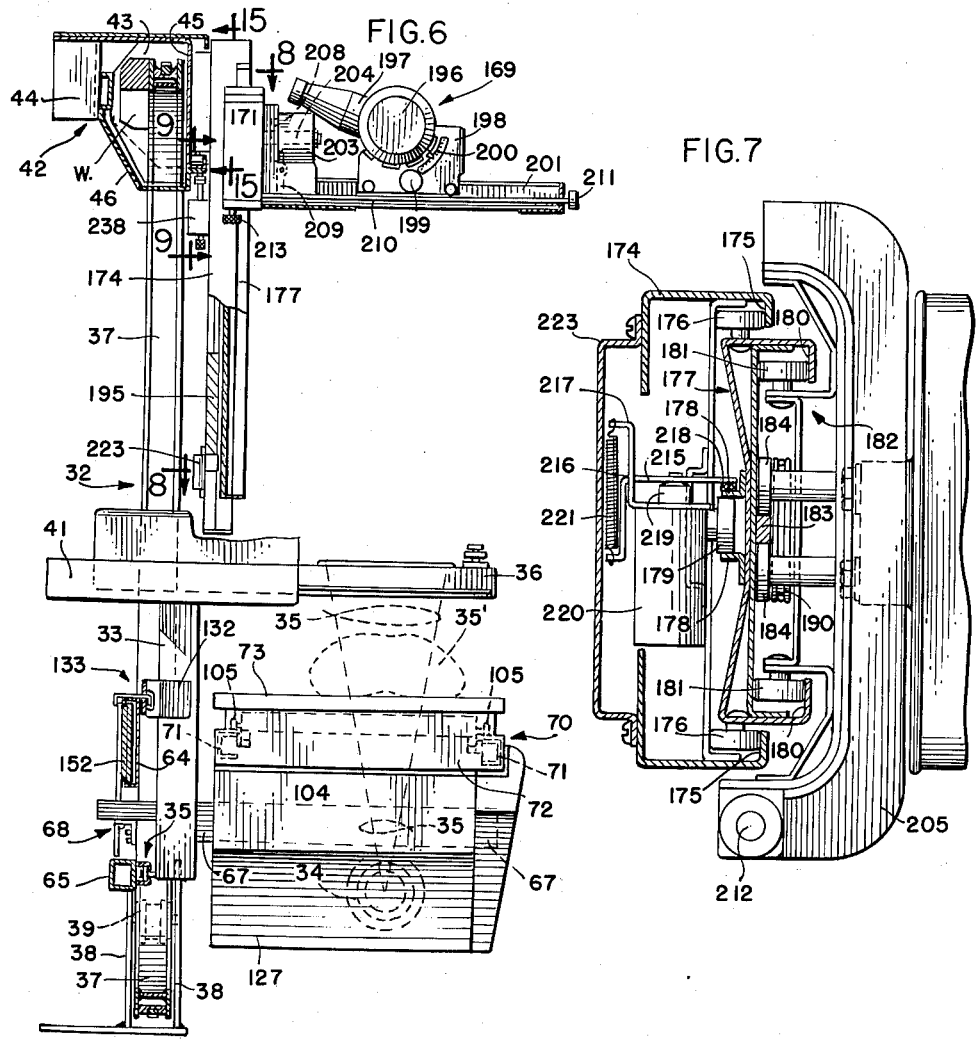

Dec. 27, 1960

A. J. KIZAUR 2,966,588

X-RAY APPARATUS

Original Filed Dec. 15, 1952

INVENTOR:—
ARTHUR J. KIZAUR
BY:—
Junius F. Cook, Jr.
ATTORNEY.

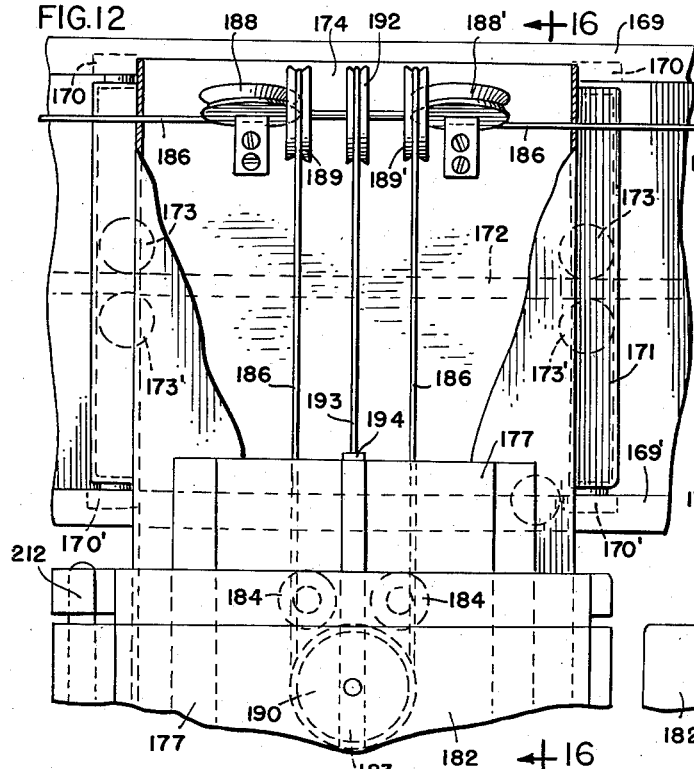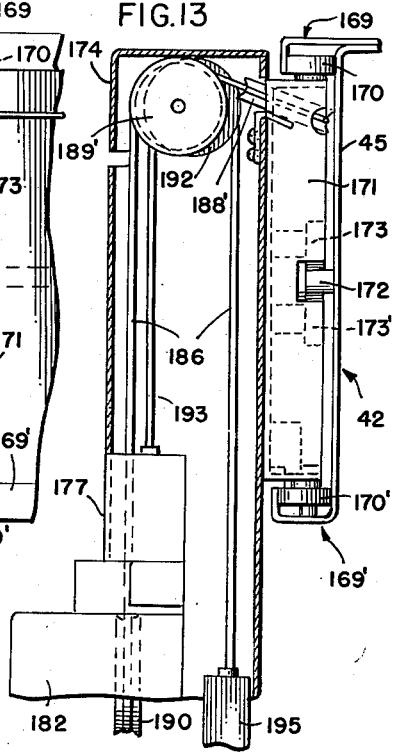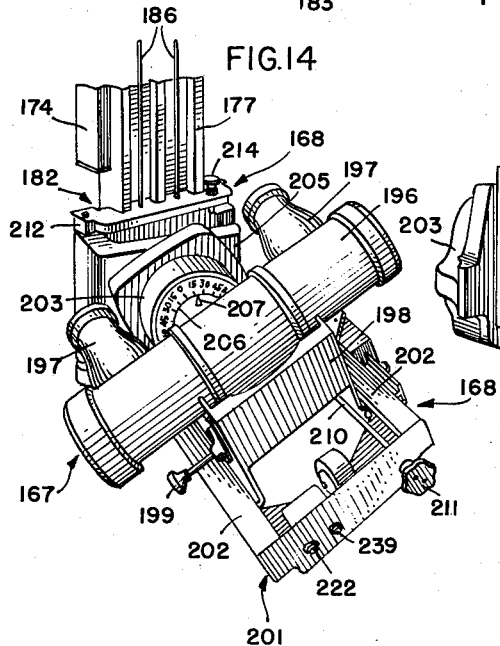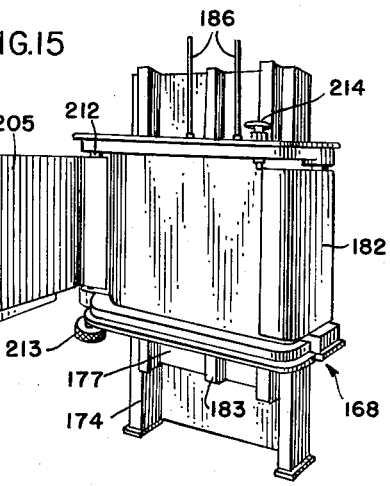

Dec. 27, 1960
A. J. KIZAUR
2,966,588
X-RAY APPARATUS
Original Filed Dec. 15, 1952
7 Sheets-Sheet 6
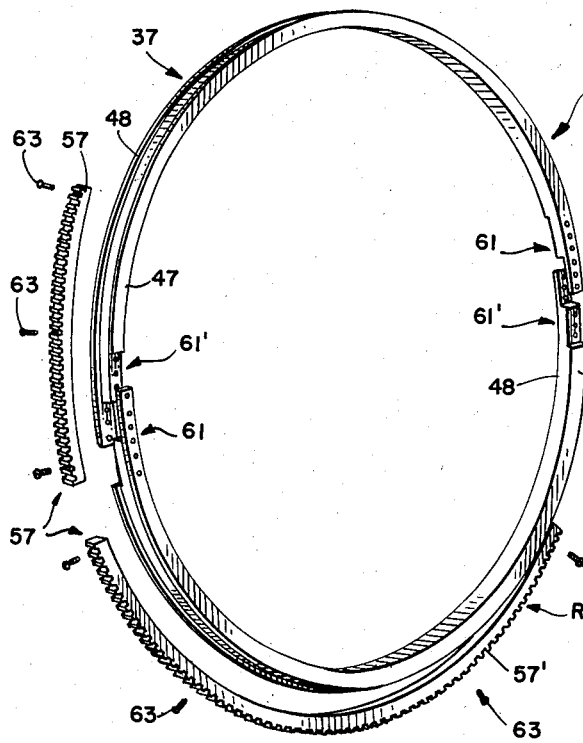
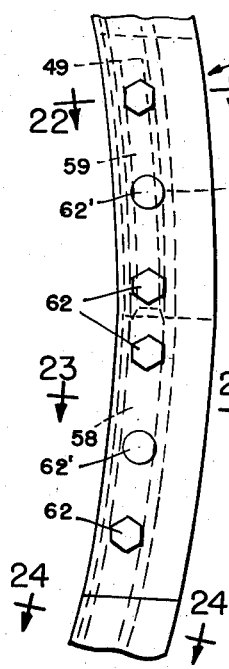
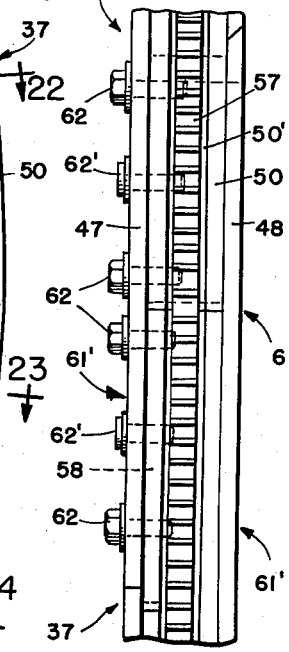
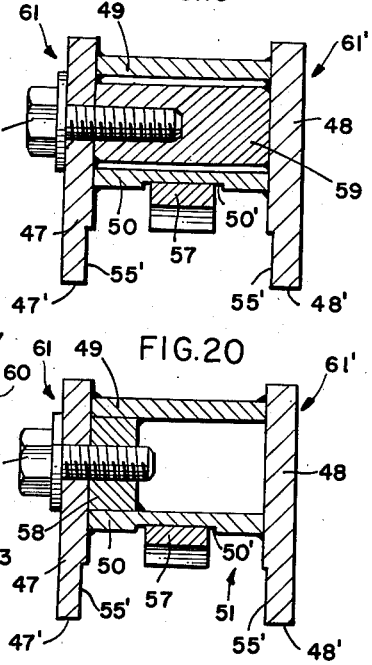
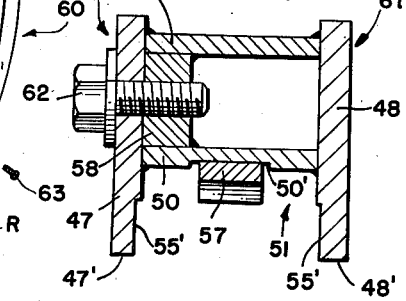
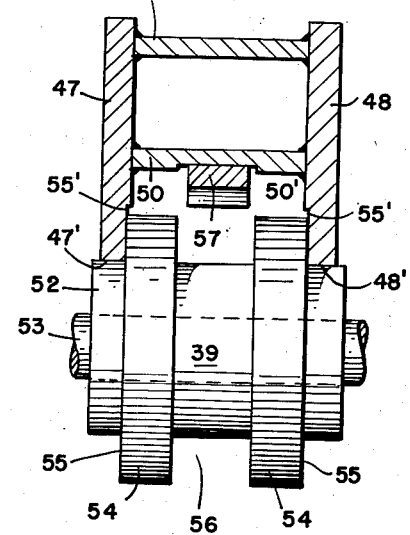
INVENTOR:—
ARTHUR J. KIZAUR
BY:—
Junius F. Cook, Jr.
ATTORNEY.

Dec. 27, 1960  A. J. KIZAUR  2,966,588
X-RAY APPARATUS
Original Filed Dec. 15, 1952  7 Sheets-Sheet 7
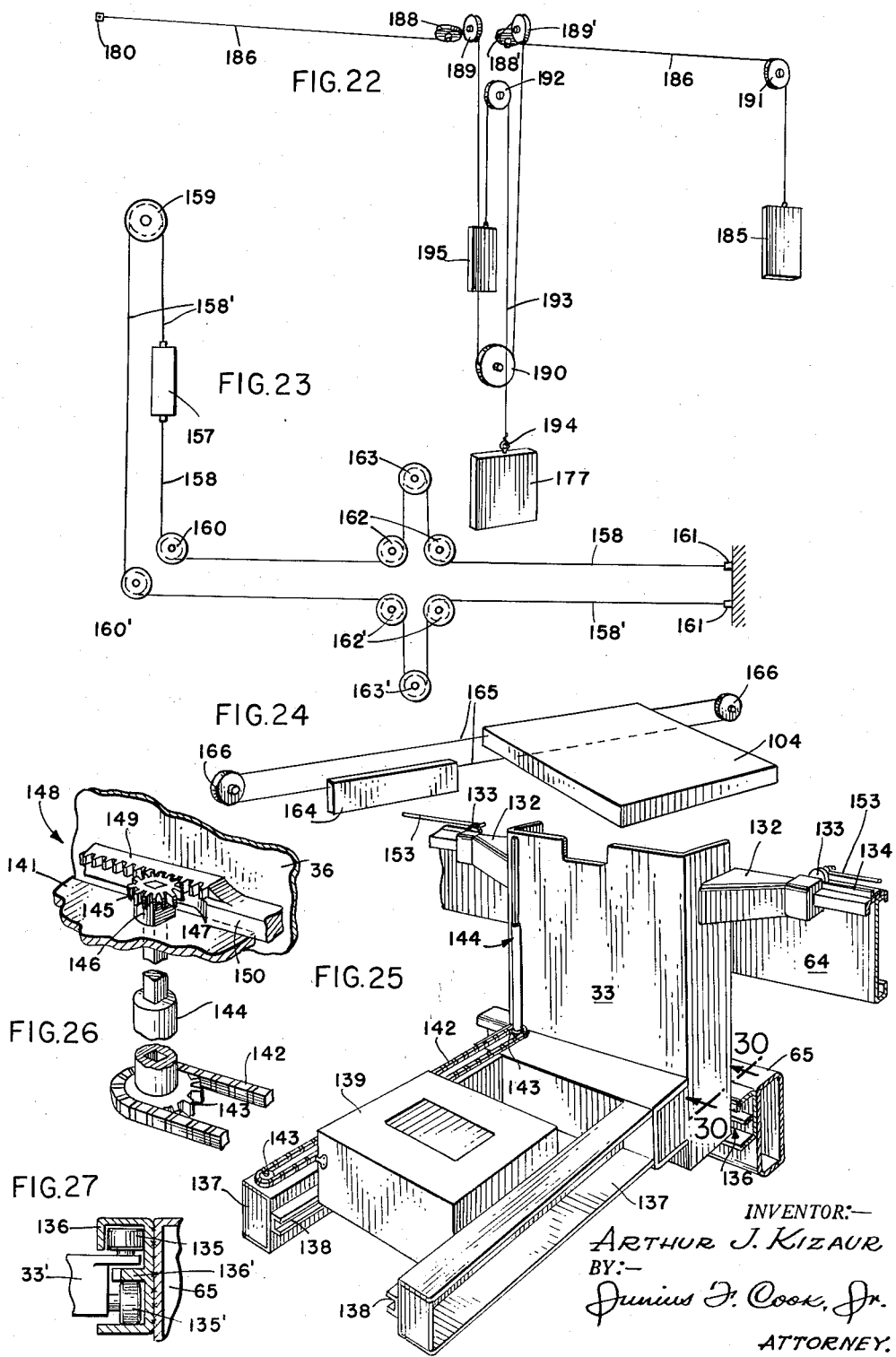
INVENTOR:—
ARTHUR J. KIZAUR
BY:—
Junius F. Cook, Jr.
ATTORNEY.

2,966,588

X-RAY APPARATUS

Arthur J. Kizaur, Brookfield, Wis., assignor to General Electric Company, a corporation of New York Original application Dec. 15, 1952, Ser. No. 326,033, now Patent No. 2,898,471, dated Aug. 4, 1959. Divided and this application Oct. 2, 1958, Ser. No. 764,911

7 Claims. (Cl. 250—57)

This application is a division of application Serial No. 326,033, filed on December 15, 1952, which matured on August 4, 1959, as U.S. Patent No. 2,898,471.

The present invention relates in general to apparatus of the sort adapted for use in the examination, treatment and picturing of objects, such as the bodies of human patients, by means of penetrating rays, such as X-rays, and the like, the invention having more particular reference to an improved tilting table structure for supporting bodies to be examined, treated or pictured, selectively in vertical, horizontal, and intermediate tilted positions to facilitate examination, photography, and treatment of a body supported on the table structure in position to be exposed to penetrating rays.

In the making of ray pictures or radiographs of human bodies, as well as in the fluoroscopic examination of patients, it is necessary to support the body of the patient in desired position between a suitable source of penetrating rays and a ray sensitive viewing screen, for fluoroscopic examination, or a ray sensitive film, in making ray pictures. It is also highly desirable, in some circumstances, to be able rapidly to change the inclination at which the object being pictured or examined is supported; and to provide for the picturing of the examination object, or a desired portion thereof, as quickly as possible after the desired picture subject matter shall have been determined by fluoroscopic examination. It is therefore desirable, in conjunction with auxiliary equipment including a penetrating ray source, or sources, ray sensitive fluoroscopic viewing screens, and ray sensitive film carriers, to provide a suitable table structure for supporting the body of a patient in position for examination, picturing and treatment, and to provide for the rapid adjustment of the table structure, as well as the auxiliary equipment, to present the examination or picture subject in desired examining or picturing positions.

As indicated in United States Letters Patent No. 1,599,696, of September 14, 1926, on the invention of Julius B. Wantz; No. 1,874,582, of August 30, 1932, on the invention of Albert C. Nelson; No. 2,038,327, of April 21, 1936, on the invention of Julius B. Wantz; No. 2,315,786, of April 6, 1943, on the invention of Julius J. Grobe; and No. 2,568,236, of September 18, 1951, on the invention of Arthur J. Kizaur, it has heretofore been the practice to provide tilting tables for receiving and supporting the object to be examined, pictured, or treated, such tables carrying auxiliary equipment including X-ray generating tubes, fluoroscopic screens, and sensitive film carriers on and adjustable with respect to the tiltably supported table structure.

In the operation of such equipment, the table may be first adjusted to support the examination subject in desired position. The examination screen or picturing film, and the X-ray source, may then be adjusted to desired position on opposite sides of the subject, after which the subject may be pictured or fluoroscopically examined by actuating the ray source to cast a shadow picture of the subject upon the picturing screen or film.

An object of the present invention is to provide a strong and rigid, yet relatively light weight table structure supported in novel fashion, so that the table may be adjusted rapidly and with minimum effort to any desired angularity about an axis of adjustment; a further object being to mount the table in a frame supported for turning movement about a medial elevated axis, whereby the table may be freely turned with its supporting frame to any desired angularity about an elevated horizontal axis above and transverse to the length of the table; a still further object being to form the frame in fashion providing an arc-like track, and to mount the same for turning movement on suitable support rollers about the axis of the ring-like track.

Another object of this invention is to arrange the table, X-ray source and fluoroescent screen for rotation together about a common axis, with the screen located in proximity to that axis, thereby to enable the operator, standing at the side of the table, without substantially changing his position along the table, to view the image on the screen continuously while the table bearing the patient, or object, being examined is moved through a wide angle about the axis, as from vertical at one side of the axis to vertical at the other side of the axis.

Another important object resides in providing improved means for latching the several adjustable tube, film and screen supporting structures in adjusted positions and for instantly releasing the same for movement to other relatively adjusted positions; a further object being to provide relatively simple and inexpensive latching means for the purpose mentioned, controlled by push buttons conveniently located in the structure for releasing the latch means; a still further object being to employ electrically actuated means for releasing the latches; a still further object being to employ latch means comprising an anchorage track mounted on one relatively shiftable part and an anchoring member on another relatively movable part and normally urged thereon into anchoring engagement with said track, including electrically actuated motive means, such as a solenoid, operable under remote push button control, for retracting the anchoring member from the track to permit relative adjusting movement between said parts; a still further object being to form the track with rack tooth and the anchoring member with a tooth or teeth for engagement with said rack tooth, where positive locking action is desired, and to form the track as a frictional brake surface and the anchoring member as a brake shoe for frictional engagement with said surface, where non-positive anchoring action is desired.

Another important object is to provide an examination table having a top panel and a film cassette carriage mounted in the table structure for movement longitudinally of the table structure beneath the top panel, including means operable, in response to the presence of a cassette in film exposing position in the carriage, to latch the carriage against longitudinal movement in the table structure; a further object being to provide cassette carriage latching means comprising a rack bar formed on and longitudinally of the table structure, a normally retracted latching member on the cassette carriage and having a finger or fingers adapted to engage the rack bar, and a cassette tray on said carriage and movable between projected cassette loading and retracted cassette mounting positions, said tray having a latch actuating portion for projecting the latch member into latching engagement with the rack bar when said tray is in retracted cassette mounting position.

Another important object is to provide an X-ray examination table structure having a body supporting top panel and carriage means movable longitudinally of the structure for supporting an X-ray source beneath, and ray sensitive screen or film means above the top panel in registration with the ray source, including a ray source carriage and a separate screen or film carriage adjustable on said carriage means transversely of the table structure, and means drivingly connecting the ray source and film or screen carriages to hold the same in position presenting the screen or film in alinement with said ray source, in all transversely adjusted positions of said film or screen carriage, within an active picturing zone; a further object being to form said driving means as a preferably telescopic shaft journaled on the carriage means and drivingly connected with the ray source carriage to move the same transversely of the table structure, said shaft having a driving pinion adapted to engage with a rack on the screen or film carriage, said rack being formed to release said pinion at one end thereof, when said screen or film carriage is transversely shifted on the carriage means to inactive position, outwardly of said picturing zone, and means to lock said ray source carriage against movement on the carriage means when said rack is disengaged from said pinion.

The foregoing and numerous other important objects, advantages, and inherent functions of the invention will become apparent as the same is more fully understood from the following description, which, taken in connection with the accompanying drawings, disclosed a preferred embodiment of the invention.

Referring to the drawings:

Fig. 6 is a sectional view taken substantially along the line 7—7 in Fig. 1;

Fig. 7 is an enlarged sectional view taken substantially along the line 8—8 in Fig. 6;

Fig. 12 is a sectional view taken substantially along the line 15—15 in Fig. 6;

Fig. 13 is a sectional view taken substantially along the line 16—16 in Fig. 12;

Figs. 14 and 15 are perspective views illustrating the upper portions of the apparatus shown in Fig. 6;

Fig. 16 is an exploded view illustrating a ring structure forming a portion of the apparatus shown in Fig. 1;

Fig. 17 is an enlarged view of a portion of the ring structure shown in Fig. 16;

Fig. 18 is an edge view of the ring portion shown in Fig. 17;

Figures 1, 2, 3:
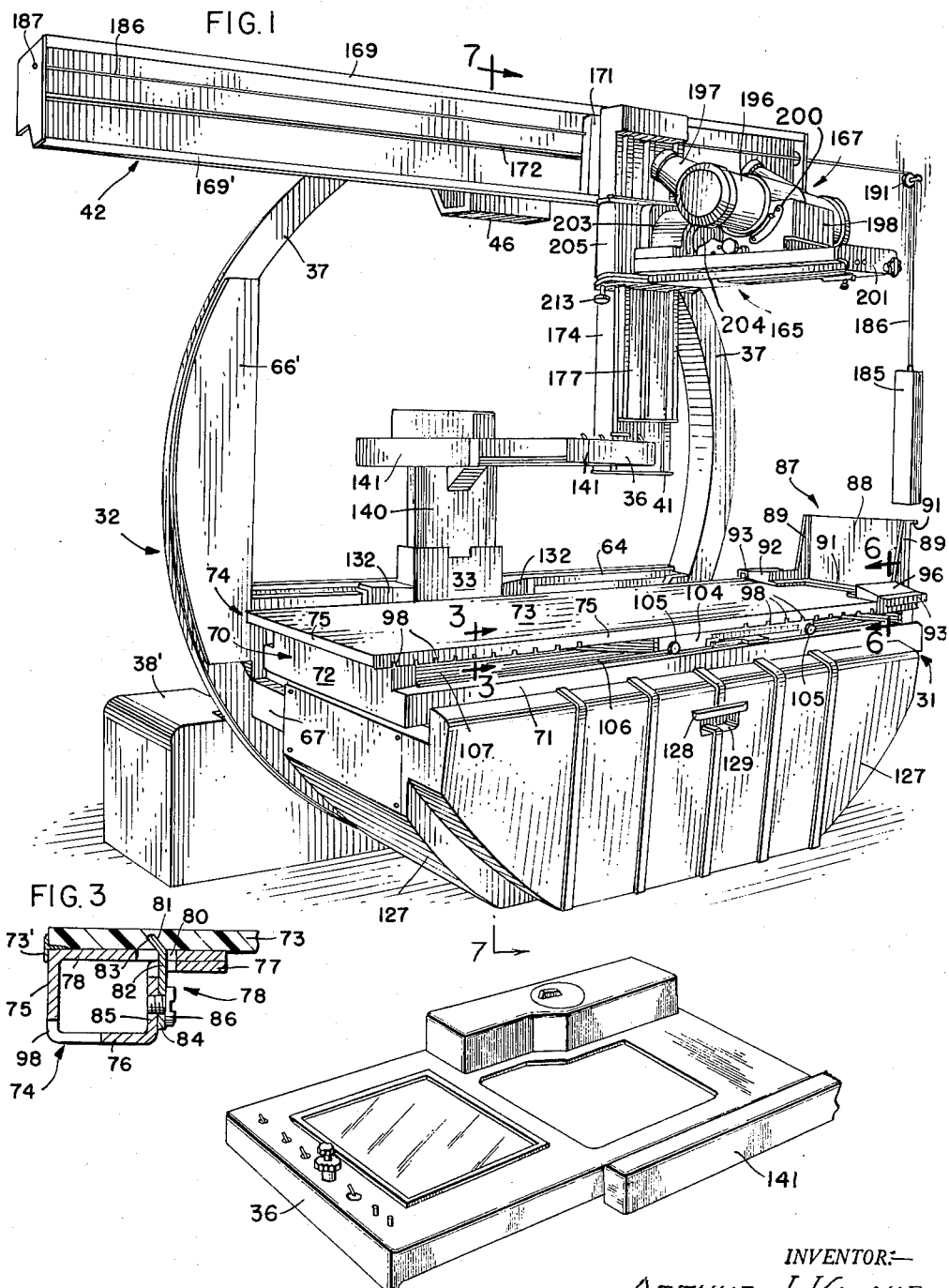
Fig. 1 is a perspective view showing X-ray apparatus embodying the present invention.
Fig. 2 is a perspective view of a portion of the apparatus shown in Fig. 1.
Fig. 3 is a sectional view taken substantially along the line 3—3 in Fig. 1.

Figs. 19, 20, and 21 are enlarged sectional views, respectively taken substantially along the lines 22—22, 23—23 and 24—24 in Fig. 17;

Figs. 22, 23, and 24 are schematic views illustrating the manner of counterbalancing several adjustable components of the apparatus;

Fig. 25 is a perspective view of a portion of the apparatus shown in Fig. 1;

Fig. 26 is an enlarged perspective view of a portion of the structure shown in Fig. 25; and Fig. 27 is a sectional view taken substantially along the line 30—30 in Fig. 25.

To illustrate the invention the drawings show apparatus including an adjustable table structure particularly well suited for supporting human bodies in position for examination and therapy, by means of penetrating rays, such as X-rays, or for the making of ray pictures of the supported body. The structure is especially well suited for such purposes in that the table structure is especially well suited for such purposes in that the table structure is tiltable supported for adjustment to any desired angularity about a central turning axis, so that a supported body may be disposed in horizontal and in any position tilted from horizontal in either direction, the table structure being tiltable to dispose a body supported thereon in vertical position in either direction. Indeed, if desired, the table structure could be disposed in any desired inverted angular position, although table inversion is not ordinarily desirable or necessary.

To these ends, as shown in Fig. 1, the apparatus comprises a table structure 31, including a top panel, turnably supported means 32 carrying the table structure, and frame means 33 mounted on the support means for movement thereon longitudinally of the table structure 31, such frame means 33 carrying a penetrating ray source, such as an X-ray generating tube, enclosed in a suitable casing structure 34, Fig. 6, and disposed in position with respect to the table structure 31 to direct a penetrating ray beam 35 upwardly through the top panel of the table structure and a body 35' disposed thereon in position for examination or therapy, or to be pictured. The frame means 33 also provides for the support thereon of a frame structure 36, Fig. 1, adapted to carry ray sensitive fluorescent screen means or ray sensitive film material, or both, in position above the table structure 31, to allow for the fluoroscopic examination or the radiographic picturing of the supported body 35' when irradiated with the beam 35 from the ray source in the casing 34. It will be seen that the ray source and the frame means 36 may be moved simultaneously and in fixed relative position longitudinally of the table structure 31, thereby allowing for radiography or fluoroscopy of the subject body 35 in any selected zone longitudinally of the table structure merely by moving the frame means 33 to an appropriately adjusted position longitudinally of the table structure.

The turnable support means 32 preferably comprises a circular ring 37 supported substantially in a vertical plane for turning movement about the central axis of the ring. To this end, the lower portions of the ring may be supported on a pair of spaced bearing structures 38, Fig. 4, which may be anchored in spaced position on the floor of the building in which the apparatus of the present invention is installed for service. Each of the structures 38 may comprise a roller 39 adapted to rollingly support the ring 37 thereon.

Figure 4:
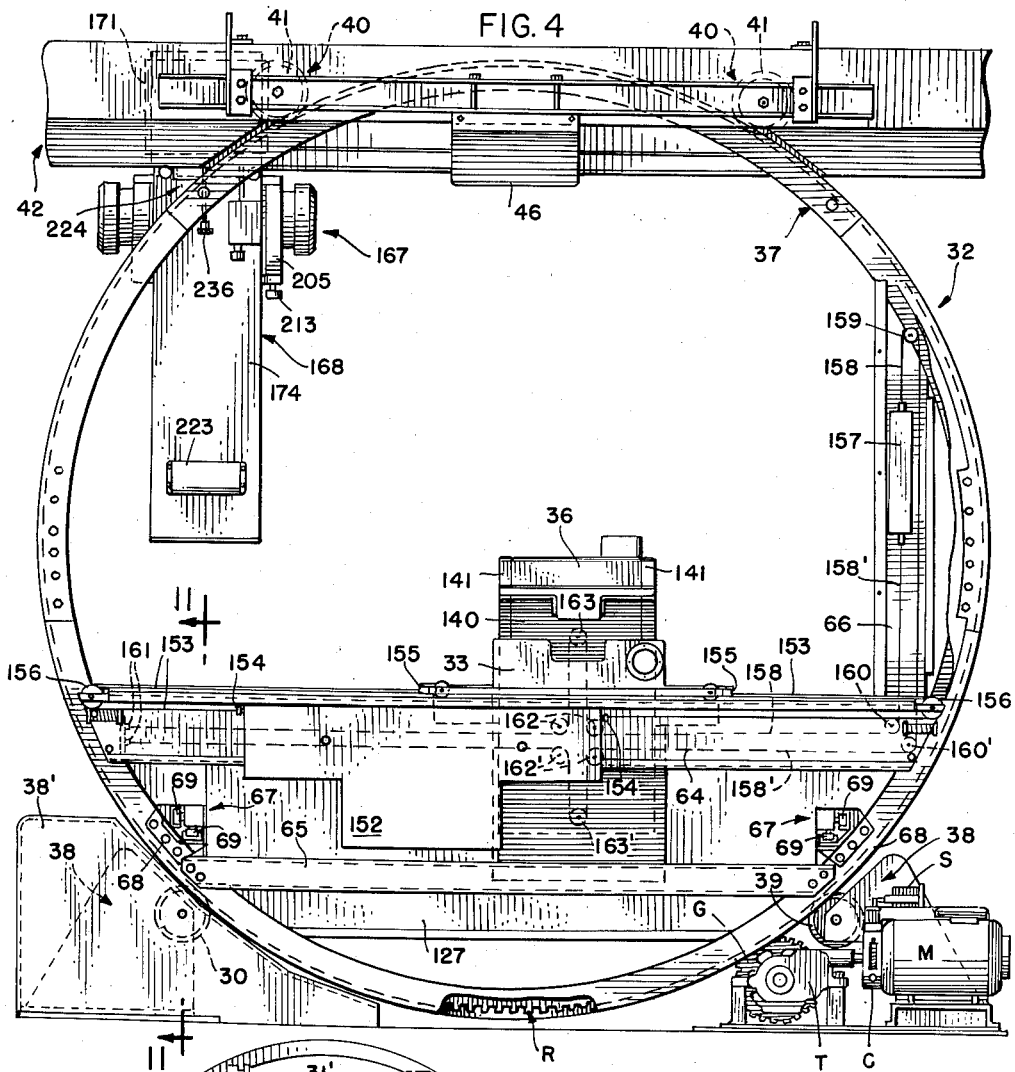
Fig. 4 is a rear view of the apparatus shown in Fig. 1.

In order to support the ring 37 in substantially vertical or upright position on the rollers 39, one or more upper bearings 40, Fig. 4, may be provided in position engaging the upper portions of the ring 37, the bearings 40 preferably comprising rollers 41 which may be identical to the rollers 39, if desired. The rollers 41, as shown, may be provided in an elongated frame preferably comprising a beam structure 42, which, in turn, may be mounted in support brackets or otherwise attached on or anchored to a wall or ceiling structure of the building in which the apparatus is installed for use.

As shown, the beam structure 42 may be of hollow, box-like construction and may comprise formed sheet metal members secured together in any convenient fashion, as by means of bolts, rivets, or other fastening elements, or by welding the parts together to form a composite beam of adequate strength and rigidity; and the beam structure preferably incorporates a downwardly opening channel or chamber 43, Fig. 6, formed between dependent back and front beam portions 44 and 45 to receive the upper portions of the ring 37 in the chamber 43. The beam may include a strap portion 46 extending within the ring 37 and rigidly interconnecting, spacing and bracing the dependent ends of the beam portions 44 and 45. The rollers 41 may be mounted in suitable journals carried by the beam structure in position supporting the rollers in spaced apart relation within the chamber 43, as shown more particularly in Fig. 4 of the drawings.

Figure 5:
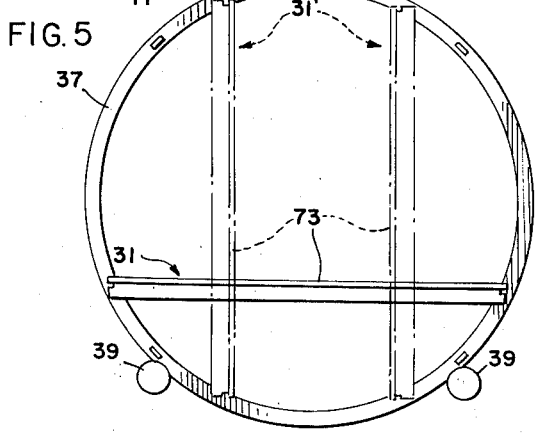
Fig. 5 is a fragmentary front view of the apparatus.

It will be seen from the foregoing that the ring 37 may thus be supported by the rollers 39 below and rollers 41 above, Fig. 4, for free and unobstructed turning movement to any desired extent and in either direction. Any suitable or preferred means may be provided for so turning the ring member and the equipment mounted thereon, including the table structure 31 and the frame 33. To this end, the ring may be provided with a circumferential toothed rack R, Fig. 4, which, if desired, may extend throughout the entire circumference of the ring. For practical purposes, however, it is ordinarily necessary to extend the rack member only through slightly more than half of the circumference of the ring, in order to provide a structure that may be tilted through a turning movement of 90 degrees in either direction from a normal or medial position, such as the position of the apparatus in which the table structure 31 is horizontal, as indicated in solid lines at 31, in Fig. 5, to the relatively vertical positions shown in dotted lines at 31'.

In conjunction with the rack R, one of the bearing structures 38 may be arranged to provide bearings for supporting a gear G, Fig. 4, in position drivingly engaging the rack R. The bearing structure may also be arranged to support a preferably electric motor M in position drivingly connected with the gear G, as through suitable, preferably geared transmission means T, suitable control means being provided for energizing the motor, preferably under push button control. The motor control means may include preferably electrically operated clutch means C for connecting the motor with the rack driving gear under the control of a clutch actuating solenoid S. Accordingly, by energizing the motor for driving movement in one direction or the other, and by operating the solenoid for the engagement of the clutch, the ring 37 may be turned in either direction, to thus adjust the relative angular position of the ring and of the equipment mounted thereon, to any desired extent about the central axis of the ring.

The ring 37, as shown more particularly in Figs. 19–24, may comprise a plurality of metal parts interconnected together to form a ring of generally box-like sectional configuration having spaced, flat, ring-like side members 47 and 48, and cylindrical inner and outer ring-like spacing members 49 and 50. The flat ring members 47 and 48 may be rigidly secured to the opposite sides of the spacing members 49 and 50, preferably in integral fashion, as by welding the parts together. The inner spacing member 49 may be connected to the members 47 and 48 at or adjacent the inner curved edges thereof, and the outer spacing member 50 is preferably interconnected between the flat ring members 47 and 48 medially between the inner and outer circular edges thereof. The ring structure thus provides an outwardly opening peripheral channel outwardly of the spacing member 50 and between the outer or peripheral edge portions of the members 47 and 48, said edge portions forming bearing surfaces 47' and 48', Fig. 21, for engagement with the rollers 39 and 41, as shown in Fig. 4.

The rollers 39 and 41 preferably comprise hub portions 52, Fig. 21, for the reception of roller mounting pins or shafts 53 and a rim portion or portions 54 providing oppositely facing shoulders 55, outwardly of the hub 52 and in spaced relation, to snugly engage between the facing surfaces of the members 47 and 48, said surfaces being preferably milled, as at 55', to form finished surfaces for smooth, frictionless engagement with the roller shoulders 55, the surfaces of the shoulders 55 being also preferably finished smooth. The hub 52, outwardly of the shoulders 55, likewise is smoothly finished to provide for smooth rolling engagement with the peripheral bearing surfaces 47' and 48' of the ring structure. The bearing surfaces 47' and 48', of course, should also be smoothly finished. As shown, the rollers are preferably formed to provide spaced apart rim portions 54, 54' defining a circular channel 56 medially of the roller. The outwardly facing surface of the spacing member 50 of the ring may be formed with a medial seat 50' for receiving and seating the rack R in the ring structure. The rack may comprise a curved rack bar 57 in position opposite the roller channel 56.

It is preferable, also that the ring structure 37 be formed in separable sections 60 to facilitate transport of the apparatus to, and the assembly of the same at, an erection site. To this end, the ring may comprise two or more sections 60 having opposed ends 61, 61' of preferably identical form and arranged for interfitting engagement, in end-to-end abutting relationship with the cooperating end of an adjacent ring section. As shown, the opposite ends of the members 49 and 50 are in alinement, while the ends of the members 47 and 48 are relatively offset or staggered, and staggered with respect to the ends of the members 49 and 50, at the opposite ends 61, 61' of each section, the staggered relationship being substantially identical in each of the cooperating ring sections.

Bracing and spacing members 58, Fig. 20, and 59, Fig. 19, preferably extend at said section ends 61 and 61' and serve to strengthen and rigidify the sections at the opposite ends thereof. The member 59 may be secured, as by welding, between the edges of the members 49 and 50, opposite the member 48, at the section end 61, in position to underlie the projecting end of the member 47 on the section end 61'. The member 59 may be secured, as by welding, on the projecting end of the member 48 at the section end 61', in position to extend between the ends of the members 49 and 50 at the section end 61, thereby presenting a surface of the member 59 in position underlying the member 47 at the section end 61. Such arrangement of the members 58 and 59 permits the sections 60 to be bolted together by fastening bolts 62 and dowels 62', Fig. 20, applied on one side of the ring only, said dowels and bolts penetrating only the member 47 on the segment end 61 and taking into the members 58 and 59, which are secured on the segment end 61'.

The rack bar 57 may likewise comprise a plurality of sections 57' adapted to be secured upon the ring 37, in end-to-end abutting relationship, in the seat 50', as by means of fastening screws 63, Fig. 19. If desired, the rack bar 57 may be applied throughout the entire circumference of the ring, or throughout an arcuate portion of the ring sufficient to attain tilting adjustment of the mechanism within a desired angular range. Where, as shown more particularly in Fig. 5, the equipment is provided for tilting adjustment to table vertical position in either direction from a normal horizontal table position, it is necesary to apply the rack bar only in a semi-circular portion of the ring, as indicated in Fig. 19.

The ring 37 may carry structural members bracing and rigidifying the same, and forming support means on which the table structure 31 and the adjustable frame means 33 are mounted. These structural members may include a pair of spaced apart chordal channel members 64 and 65, Fig. 4, which may be bolted or otherwise secured to the ring in position preferably extending parallel with respect to the table structure 31. The structure may also include another preferably formed sheet metal channel member 66, Fig. 4, extending chordally of the ring 37, as at right angles with respect to the member 64, said member 66 being secured rigidly, as by welding, at one end to the member 64 and at its other end to the ring.

A pair of formed sheet metal beams 67, Figs. 1, 4, 6, and 10, preferably of cantilever type, are rigidly connected on the ring 37 adjacent the opposite ends of the member 65, in position extending beneath the table structure 31 to provide support for the same, on one side of the ring. These beams, at one end, may be fastened rigidly to and braced upon the ring 37, as by means of brackets 68. The outer or projecting ends of the beams 67, if desired, may be bracingly interconnected, as by means of a tie rod. The table structure 31 is supported for adjusting movement on the beams 67 toward and away from the plane of the ring 37, in a direction transversely of the table structure, the table structure to this end being provided with rollers 69, Fig. 4, formed for rolling engagement in trackways on and longitudinally of the beams.

As shown in Figs. 1 and 6, the table structure 31 may conveniently comprise a rectangular frame 70 embodying a pair of spaced apart, longitudinally extending frame members 71 rigidly interconnected in spaced relationship by transverse bracing and spacing members 72 forming the opposite ends of the frame, the members 71 and 72 preferably comprising box-like members formed of sheet metal, such as steel, rigidly secured together at the meeting ends of the members, to form the corners of the frame. It will, of course, be apparent that the invention is not necessarily limited to the particular sectional shape of the frame members, nor the manner of interconnecting the same together, since the same may be fastened together in any suitable or convenient fashion, as by welding, to provide an exceedingly rigid yet relatively inexpensive, light weight frame structure, the preferred box-like character of the frame members affording a structure of unusual rigidity.

The table frame 70 may carry a table top panel 73 secured to the frame in any suitable or preferred fashion, as on upward extensions of the frame end members 72, at the opposite ends of the top panel. The table top panel may comprise a rectangular, board-like element of preferably homogeneous character, and a preferably formed sheet metal frame 74, Fig. 3, secured to and beneath the marginal edges of the panel for the purpose of strengthening and rigidifying the same. The frame 74 may comprise longitudinal and transverse end members 75 rigidly secured together, as by welding, at the corners of the frame, said members, as shown more especially in Fig. 3 of the drawings, being each formed from a bent metal strip, the medial portions of which form an elongated portion 76 of box-like sectional configuration, the opposite side edges of the strip being disposed in overlapping relationship and preferably integrated, as by welding, to form a flange 77 extending, at one corner of the portion 76, in the plane of a side wall 78 of said portion. The flanges 77 and side wall portions 78 of the frame members 75 form a peripheral seat for receiving and supporting the marginal edges of the panel 73; and any suitable means may be provided for securing the panel edges in mounted position on said peripheral seat.

As shown more particularly in Fig. 3 of the drawings, however, simplified and improved fastening means 79 may be provided at intervals on the frame members 75 for securing the panel member 73 on the frame 74. To this end, the members 75 may be formed at intervals with openings 80 through the flange 77 at the junction thereof with the portion 76. The under side of the panel 73 may be formed with inclined slits 81 opening upon the under side of the panel in registration with the openings 80, said slits extending upwardly and in a direction preferably outwardly in the panel member. Spring clips 82, preferably comprising metal strips, may be employed for securing the panel upon the members 75 at the openings 80. These spring clips may comprise metal strips each having a bent end 83 adapted for removable insertion in a slit 81, and a shank 84 adapted to extend outwardly of the lower surface of the panel through a said opening 80 in position overlying the wall 85 of the frame portion 76 which extends at right angles to the flange 77 at the opening 80. The shank 84 may be secured in any suitable or preferred fashion to the wall 85, as by means of a removable set screw 86.

It will be seen that resilient clips 82 applied at intervals along the marginal edges of the panel member 73 will resiliently yet securely hold the same to the frame 74. The clips 82 need not be applied upon the panel until the same is assembled and fastened upon the frame. Accordingly, panel members may be fabricated and stored without special care to preserve mounted clips against damage or deformation prior to assembly on the frame 74. The panel fastening arrangement is exceedingly simple and inexpensive, neat and unobtrusive, and affords strong, firm anchorage of the panel 73 on the frame 74.

The present invention also contemplates a removable foot rest structure 87, shown at the right in Fig. 1, of simple and inexpensive character, for removable attachment on the table top in fashion adjustable longitudinally of the table structure, to provide foot rest support for the body of a human examination subject when the table structure is tilted substantially from horizontal in either direction. To this end, the foot rest structure 87 is adapted for removable attachment on the table top, at and inwardly of either end of the panel 73. As shown more particularly in Figs. 1 and 6 of the drawings, the foot rest structure 87 preferably comprises a formed sheet metal foot rest member 88 having upwardly turned side flanges 89, an upstanding back flange 91, and box-like side wings 92 of generally triangular sectional configuration, formed at the opposite sides of the foot rest member 88 in position to register with and overlie the opposite side edge portions of the panel 73.

Latching handles 93 are carried on the side wings 92 at the opposite sides of the foot rest structure 87, and serve to operate latching means not shown to latch the foot rest to the table.

Figure 8:
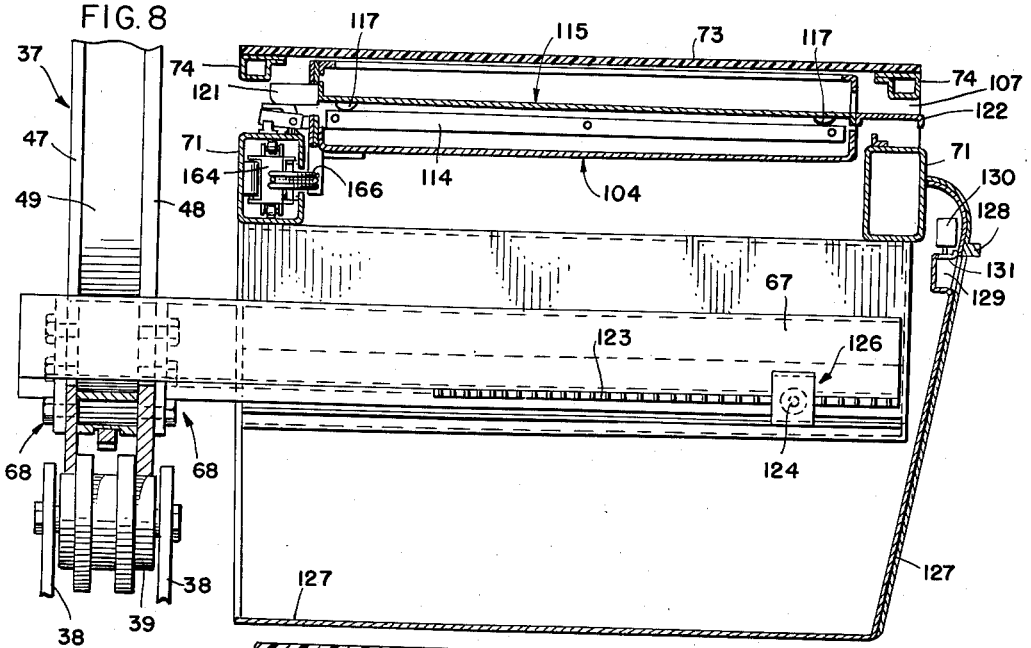
Fig. 8 is an enlarged sectional view illustrating the lower portion of the apparatus shown in Fig. 6.

Immediately beneath the top panel 73, Fig. 1, the frame structure 70 may provide a mounting for a casette and diaphragm carriage 104, as shown in Figs. 1 and 8, the same being provided with bearing wheels 105, Figs. 1, 6 and 8, in position to ride upon suitable tracks 106, Fig. 1, on and extending longitudinally of the side frame members 71, so that the carriage 104 may be shifted to any desired position longitudinally of the frame 70 beneath the top panel 73. In this connection, it will be noted that the panel 73, at its forward longitudinal edge, remote from the ring member 37, is spaced above the frame member 71 to form a slot-like opening 107, Figs. 8 and 9, through which access to the cassette carriage may be had. The function of the cassette carriage is to removably receive and support a case or cassette adapted to receive X-ray sensitive material enclosed in light-tight fashion in the cassette. A cassette thus loaded with film may be introduced into mounted position in the carirage 104, Fig. 8, through the slot-like opening 107. When in mounted position in the carriage, the cassette enclosed sensitive film may be adjusted longitudinally of the table structure to any desired picturing position for exposure to X-rays penetrating an object supported on the panel 73.

Figure 9:
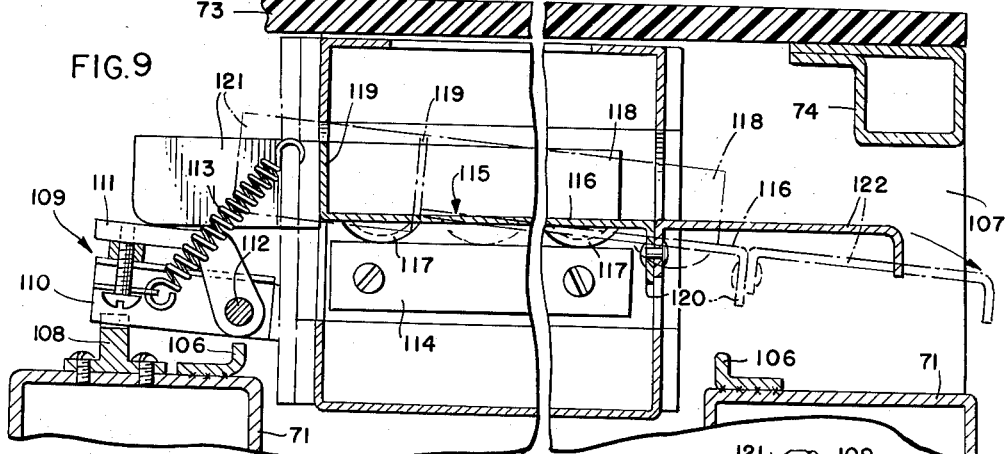
Fig. 9 is an enlarged view of portions of the equipment shown in Fig. 8.
Figure 11:
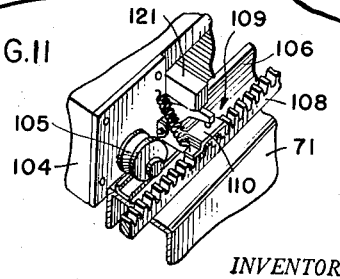

As shown more particularly in Figs. 8, 9, and 11, means may be provided for latching the carriage 104 in any adjusted position longitudinally of the table frame. To this end, a latching rack bar 108, Fig. 9, may be secured on the longitudinal frame member 71 of the table frame structure, on the side thereof adjacent the ring 37, said rack bar being mounted on the frame member 71 outwardly of the carriage track 106, Fig. 11, and extending substantially from end to end of the table structure. A latch member 109, Figs. 9 and 11, may be movably mounted on the carriage 104 in position to latchingly engage with the teeth of the rack bar 108 in all longitudinally adjusted positions of the carriage 104.

As shown, the latch member 109 may comprise a sheet metal stamping 110 formed with spaced flanges adapted for engagement with the teeth of the rack bar, said stamping being secured on an arm 111, Fig. 9, pivoted, as at 112, on the carriage 104, spring means 113 being provided for normally urging the latch means 109 in a direction releasing the same from engagement with the rack bar 108.

The carriage comprises a frame forming transverse track bars 114, Fig. 9, in position to support a cassette receiving tray 115 in the carriage, said tray preferably comprising a sheet metal element providing a rectangular bottom wall 116 formed with downwardly pressed feet 117 at the corners of said bottom wall for sliding engagement with the track bars 114. The tray 115 is also preferably formed with upstanding flanges 118 at the opposite sides of the floor member 116, an upwardly extending flange 119 along the rear edge of the floor member, and a dependent flange 120 at the front edge of the floor member. The tray 115 also carries a latch actuating finger 121 fastened on and extending rearwardly of the upstanding flange 119, and a preferably sheet metal operating handle 122 on and extending forwardly of the dependent flange 120.

The handle 122 is thus disposed in the opening 107 in position to be grasped by the hand of an operator. The tray 115 normally occupies a retracted picturing position in the carriage 104, as shown in Figs. 8 and 9. In such position a cassette disposed in the tray 115 in engagement with the flanges 118 and 119 will be presented in picturing position centered with respect to the top panel 73 of the table structure. When in retracted position, it will be noted that the tray feet 117, at the front as well as the back corners of the tray, will be supported by the bars 114 in order to carry the tray in parallel relationship with respect to the table top panel 73. When in such retracted position, the actuating finger 121 will press the latch means 109 into engagement with the rack bar 108, thereby holding the carriage 104 in adjusted position against movement on the tracks 106 longitudinally of the table. Accordingly, the X-ray sensitive film in a tray mounted cassette will be presented in fixed picturing position beneath the top panel 73.

By operation of the handle 122, the tray 115, Fig. 9, may be drawn from retracted to a projected position, as shown in dotted lines in Fig. 9, thereby releasing the latch means 109 so that the carriage 104 may be moved longitudinally of the table on the tracks 106. In such projected position, the front feet 117 of the tray are disposed outwardly of the forward ends of the bars 114 and the tray, accordingly, will be presented in downwardly and forwardly inclined projected position, thereby facilitating removal and replacement of cassettes from and onto the tray through the opening 107.

Figure 10:
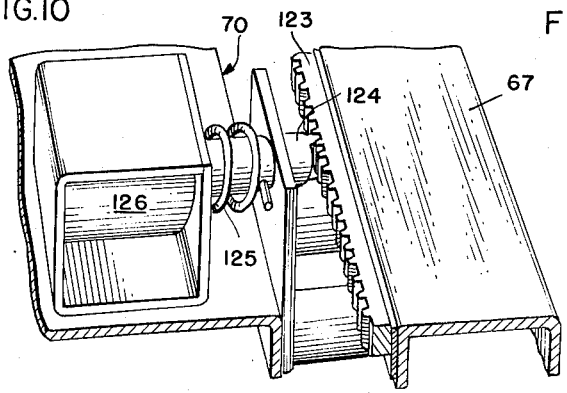
Figs. 10 and 11 are perspective views of portions of the apparatus shown in Fig. 8.

As shown in Figs. 8 and 10, means may be provided for latchingly securing the table frame structure in any laterally adjusted position longitudinally of the cantilever beams 67. To this end, latching means, comprising a rack bar 123 and a coperating shiftable latch member 124, may be employed, said bar and member being respectively mounted the one on the table frame structure and the other on one of the beams 67. If desired, of course, latching means may be provided for latching the table structure on both of the beams 67, but, as shown, a single rack bar 123 is provided on and extending longitudinally of one of the beams 67, and a detent 124, comprising an axially shiftable stem formed with a rib or tooth adapted to engage between any pair of teeth of the rack bar, is mounted in the table structure 70 in position to travel longitudinally of the rack bar 123 as the table structure is adjustably shifted on and longitudinally of the supporting beam 67 in a direction laterally of the table structure.

While any suitable or preferred means may be employed for actuating the latching member 124, the same preferably comprises a stem normally urged on the table structure, as by means of a spring 125, into latching engagement with the rack bar 123, electrically operable solenoid means 126 being provided for retracting the latch member 124 from latching engagement with the rack bar 123.

The lower portions of the table structure may be enclosed in a preferably sheet metal casing 127 secured on and dependent from the frame 70, and preferably formed to enclose the front, bottom and ends of the table structure beneath the frame 70, including the beams 67, the dependent portions of the table structure whereby the same is mounted on the beams 67, the X-ray source casing 34, and the means for mounting the same in the table structure. The front wall of the casing 127 may be formed with a handle 128 and a finger cavity 129 beneath the handle. A normally open electrical switch 130, Fig. 8, may be mounted on and in concealed position within the casing 127, Fig. 11, said switch having an operating handle formed as a presser plate 131 disposed in the cavity 129, Figs. 1 and 8, in position to be pressed by the fingers of the operator when grasping the handle 128 for the purpose of adjusting the table structure longitudinally of the beams 67. The switch 130, shown by a rectangle at the right side of Fig. 8, may be electrically connected with a suitable power source and with the solenoid 126, Fig. 10, whereby the latching member 124 will be retracted by the operation of the slenoid when the operator grasps the handle 128 and closes the switch 130.

The frame 33, Figs. 1, 4, and 25, preferably comprises a hollow, light weight sheet metal structure provided with oppositely outstanding arms 132 at the top of the frame, said arms providing rollers 133 in position rollingly to engage a track 134 formed on the chordal beam 64 to suspend the frame 33 for movement longitudinally of the beam. The lower end of the frame 33 extends in front of the chordal beam 65 and is provided with spaced apart rollers 135, Fig. 27, in position to ride on a track 136 formed on the chordal beam 65, whereby the frame 33 may be adjustably moved along the longitudinal side of the table structure which faces toward the ring 37.

The frame 33, Fig. 25, provides carriage means for the screen and film carrying frame structure 36, Fig. 1, and also for the X-ray source within the casing 34, Fig. 6. To this end, the lower portions of the frame 33 may carry a pair of spaced apart, box-like beam members 137, Fig. 25, of preferably sheet metal construction, formed on the carriage frame 33 and extending thence within the table structure beneath the frame portion 70 thereof. The beams 137 on the inwardly facing sides thereof may be provided with preferably channeled track forming members 138 extending longitudinally of the beam members 137. The ray source casing 34 may be secured on and beneath a carriage frame 139 mounted in position between the beam members 137 and provided with roller wheels for engagement in the track forming members 138, whereby the carriage frame 139 and the ray source casing 34 suspended thereon may be adjusted longitudinally of the members 137 transversely of the table structure. The carriage frame 139 may also contain adjustable shutter means for regulating the ray beam emitted by the ray source in the casing 34.

Means is also provided for mounting the frame 36, Figs. 1, 4, and 6, movably in the frame 33, shown in position near the axis of rotation of supporting ring 32, so that the ray sensitive screen and film means supported on the frame 36 may be moved toward and away from the table top panel 73, and toward and away from such axis. To this end, the carriage 33 provides a guide track for receiving a carrying frame 140, Fig. 4, of preferably hollow sheet metal construction, suitable track and roller means being provided for mounting the frame 140, Figs. 1, 4, and 6, for movement on the carriage 33 in a direction normal to the plane of the top panel 73. The frame 140, in turn, provides a pair of channel members 141, Fig. 1, forming trackways for supporting the opposite sides of the frame 36, so that said frame may be adjusted in the trackways in a direction transversely of the table top.

The frame 36 preferably carries serialographic apparatus of the sort shown in an application for United States Letters Patent shortly to be filed on the invention of A. J. Kizaur and R. J. Mueller, somewhat comparable apparatus being also illustrated in United States Letters Patent No. 2,552,858 of May 15, 1951, on the invention of R. J. Mueller and Ivan Burgeson. Such equipment embodies a fluorescent screen forming a picturing zone, in the frame 36, and a shiftable ray sensitive film cassette carriage, whereby a cassette carrying material sensitive to X-rays or other penetrating rays, normally retained in retracted position outwardly of the picturing zone, may be projected at will into picturing position in said zone beneath the screen.

Accordingly, by positioning the frame 36 to dispose the picturing zone thereof above the table top for excitation by rays emanating from the ray source in the casing 34 beneath the table, a visual ray picture of a body 35 on the table top may be established on the screen or may be photographed upon ray sensitive material in a casette in projected position in the picturing zone. The frame structure 36 may be adjusted in the guiding and supporting channels 141 to a projected position presenting the picturing zone in vertical alignment with a ray beam emanating from the source in the casing 34. The frame structure 36 may also be disposed in retracted or inactive position, in which the frame 36 is substantially withdrawn from projected position above the table top to leave the same unobstructed above a body 35 supported thereon.

One of the advantages of the structure above described, involving frames 33 and 36 and X-ray source within housing 139, resides in the fact that this whole apparatus may be positioned near the center of the table with the sensitive screen carrying frame 36 at or near the transverse axis about which the entire structure including the table rotates. This enables the operator, standing beside the table, and viewing the image on the fluorescent screen in frame 36, which may be of a patient lying on the table, to view the image continuously, while the table and patient are moved through a wide angle about that transverse axis, as from vertical at one side to vertical at the other, and without himself moving longitudinally of the table or removing his eyes from the image. Thus any changes in the image, produced by movement of the patient, and which may be of significance to the operator, doctor, or physician, may be continuously, and if desired repeatedly observed.

The present invention contemplates the provision of means for drivingly interconnecting the frame 36 with the ray source carrying frame 139, so that when in active projected position the picturing zone area of the equipment on the frame 36 may be locked in vertical alinement with respect to the ray source in the casing 34. Accordingly, the picturing zone and ray source may be adjusted laterally of the table top, in unison within limits, while maintaining such vertical alinement of the picturing zone area and ray source, including means for disconnecting the frame 36 from the source carriage 139 and for locking the source carriage against movement transversely of the table structure, when the frame 36 is moved to its retracted position in the carrying frame comprising the channel members 141.

To this end, the source carriage 139, Fig. 25, may be drivingly connected with a flexible driving member, preferably comprising a chain 142, Fig. 25, carried on spaced wheels 143 mounted on the frame 33 at the opposite ends of one of the beams 137. One of the wheels 143 may be drivingly connected with telescopic drive shaft means 144 extending within one of the channel members 141, as shown more particularly in Figs. 25 and 26. The drive shaft means within the channel member 141 may be drivingly connected with a pinion 145 having a hub portion 146 provided on one side with a flat face 147. The frame 36, at the edge thereof within the channel 141, may be provided with a latching and driving bar 148, having a portion 149 formed with rack teeth in position to engage the pinion 145 and a relatively offset locking portion 150 adapted to register with the hub portion 146 of the pinion.

The parts are so arranged that when the frame 36 is in retracted, stand-by or parked position, the bar portion 150 will engage with the flat face 147 of the pinion, thereby holding the shaft means 144 against rotation and locking the ray source carriage 139 in parked position against movement longitudinally of the beams 137 along the trackways 138. As the frame 36 is drawn toward projected position over the table top panel 73, the locking portion 150 of the bar will disengage the flat face 147 of the pinion as the picturing zone of the mechanism on the frame 36 reaches active position above the table top panel. At the same time, one end of the rack portion 149 of the bar 148 will engage the pinion 145 so as to drivingly connect the source carriage 139 with the frame 36. Thereafter, continued adjusting movement of the frame 36 forwardly over the table top panel 73 will cause the source carriage and frame to move in unison with the ray source in vertical alinement with the center of the picturing zone, to thereby permit the picturing equipment to be adjusted to any desired position laterally of the table top panel.

The weight of the frame 33 and of the equipment mounted thereon, including the ray source casing 34 and its carriage 139, and the frame 36 and its carriage 140, is counterbalanced substantially about the rotary axis of the ring 37 for all adjusted positions of the frames 33 and 140. To this end, a counterweight 152, Fig. 4, comprising a frame of suitable mass is provided with suitable wheels or rollers adapted for engagement with longitudinal tracks formed on the chordal member 64, whereby said counterweight is freely movable longitudinally of said chordal member. A pair of cables 153, Fig. 4, each anchored at one end, as at 154, on the counterweight frame, and at the other end, as at 155, on the frame 33, is provided for interconnecting the frame with the counterweight, the cables being guided around suitable pulleys 156 mounted on and at the opposite ends of the chordal member 64. The mass of the counterweight 152, of course, may be adjusted in accordance with the total weight of the frame 33 and the mechanism mounted thereon, to thereby counterbalance said weight at all times about the axis of rotation of the ring 37.

In order to counterbalance the weight of the carriage frame 140, Fig. 4, and the equipment supported thereon about the turning axis of the ring 37, a counterweight 157, Fig. 4, is provided for movement in and longitudinally of the chordal member 66, shown at the right side of Fig. 4, said counterweight being preferably provided with suitable roller means engaging trackways formed on said chordal member. Cables 158, 158' are provided for operatively connecting the counterweight 157 with the frame 140 in such fashion as to counterbalance the weight of said frame and equipment carried thereby about the turning axis of the ring 37, regardless of the adjusted position of the frame 33 along the chordal members 64 and 65 and regardless of the adjustment of the frame 140 in the frame 33. The cables 158 and 158', respectively, are accordingly connected to the opposite ends of the counterweight 157 and extend thence around guide pulleys 159 on the chordal member 66 and pulleys 160 and 160' on the chordal member 64 adjacent its point of connection with the chordal member 66. The cables 158 and 158', from their guide pulleys 160 and 160', Fig. 4, respectively extend within and longitudinally of the chordal member 64, said cables, at the ends thereof remote from the counterweight 157, being anchored, as at 161, on the chordal member 64 at the end thereof remote from the pulleys 160 and 160'. Between the pulleys 160, 160' and the cable anchors 161, the cables 158 and 158' are guided, respectively, on spaced pulleys 162 and 162' on the frame 33. Between the pulleys 162 the cable 158 forms a loop around a pulley 163 on the frame 140, and the cable 158', between the spaced pulleys 162', likewise forms a loop around a pulley 163' on the frame 140, the pulleys 163 and 163' being spaced apart on the frame 140.

It will be seen from the foregoing, and from Fig. 23, that the cables 158 and 158' are free to travel around the pulleys 162, 162', 163 and 163' in response to movement of the frame 33 longitudinally of the chordal members 64 and 65, without shifting the counterweight 157 longitudinally of the chordal member 66. The weight 157, however, will at all times be connected in counterbalanced relationship with respect to the frame 140, to thereby counterbalance the weight of said frame and the equipment carried thereon about the axis of rotation of the ring 37. In that respect, movement of the frame 140 with respect to the frame 33, in one direction or the other transversely of the chordal members 64 and 65, as during adjustment of the frame 36 toward and away from the table top panel 73, will result in shortening or lengthening the cable loop around the pulley 163, and, conversely, in lengthening or shortening the cable loop around the pulley 163'. As a consequence, the counterweight 157 will be adjusted on the chordal member 66 in accordance with the adjustment of the frame 140 in the frame 33, in order, at all times, to counterbalance the weight of the frame 140 about the turning axis of the ring 37.

The cassette carriage 104, which as previously mentioned is mounted within the frame 70 of the table structure for movement longitudinally thereof, is also counterbalanced against a weight 164, Fig. 24, of suitable mass, said weight being movable on suitable roller trackways formed in the table frame structure 70, the opposite ends of the counterweight 164 being connected with the opposite ends of the carriage 104, as by means of cables 165 guided on pulleys 166 mounted in the table frame structure at the opposite ends thereof.

In conjunction with the above described tilting table structure, the present invention contemplates improved means for supporting a ray source 167, Fig. 17, in position above the table structure to direct rays through the top panel 73 and upon cassette enclosed ray sensitive material mounted in the carriage 104 beneath or behind said top panel, in order to provide for the making of radiographic pictures of a body supported on the table top. Since thte table is adapted to be positioned at any desired inclination, it is desirable to provide for supporting the ray source 167 in any required position and at any required inclination within the adjustable range of the source supporting mechanism to permit the ray source to be disposed in centered alinement with the sensitive cassette enclosed material in the carriage 104. Accordingly, the present invention contempltaes readily adjustable and counterbalanced apparatus 168, Fig. 17, for supporting the ray source 167 for universal adjustment within the range of the supporting apparatus, said apparatus being adjustably movably rapidly and with minimum physical effort on the part of the operator.

To these ends, the beam structure 42, Fig. 1, provides roller trackways 169, 169' extending longitudinally of the beam between the opposite ends thereof, which trackways may comprise track forming channel portions provided in the beam structure for the reception of upper and lower rollers 170, 170', Fig. 12, mounted on a preferably formed sheet metal carriage 171, Figs. 1 and 13, which may have generally rectangular, flat configuration. The beam structure 42 may also include a rib or flange 172, Figs. 1 and 12, extending longitudinally between the opposite ends of the beam structure and medially between the trackways 169 and 169'. The carriage 171 also preferably carries a pair of spaced apart upper rollers 173, Figs. 12 and 13, and a corresponding pair of lower rollers 173', Fig. 12, at the opposite ends of the carriage in position to rollingly engage the opposite sides of the rib 172, whereby to support the carriage 171 for free adjusting movement longitudinally of the beam structure 42.

Secured on the carriage 171, on the side thereof which faces outwardly away from the beam structure 42, is a preferably formed sheet metal channel member 174, Figs. 1, 4, 6, and 13, secured at one end on the carriage 171, the opposite end of said channel member extending substantially beneath the carriage 171, the channel member 174 providing spaced vertical trackways 175, Fig. 7, along the opposite sides thereof for the reception of spaced apart upper and lower rollers 176 mounted on the opposite sides of a preferably sheet metal channel structure 177, whereby to mount the channel structure 177 for slidably adjusting vertical movement on the channel member 174. The channel structure 177 is provided with spaced apart, longitudinally extending flanges 178 forming a roller trackway along the back of the structure medially between the opposite side edges thereof, said trackway facing toward the channel member 174 and being sized to receive one or more rollers 179 mounted on the channel member 174 medially between the trackways 175 in position to engage and ride between the track forming flanges 178.

The channel structure 177, Fig. 7, is also formed to provide a pair of spaced apart, mutually facing vertical trackways 180 along the opposite sides thereof for the reception of spaced apart upper and lower rollers 181 mounted on the opposite sides of a preferably sheet metal carriage structure 182, Figs. 7 and 15, whereby to mount the carriage structure 182 for slidably adjusting vertical movement longitudinally of the structure 177. The channel structure 177 is provided with a longitudinally extending rib 183, Figs. 7 and 15, disposed medially between the tracks 180, and the carriage 182 is provided with an upper and lower pair of rollers 184 in position to engage and ride upon the opposite surfaces of the rib 183.

The carriage 182, Figs. 7 and 17, is thus adjustable longitudinally of the vertical frame structure 177, which, in turn, is longitudinally adjustable with respect to the vertical channel member 174, so that the carriage 182 may be disposed at any desired elevation with respect to the table structure within the extension limits of the members 174 and 177 and of the carriage 182 on the member 177; and said carriage 182 also may be adjusted to any longitudinal position with respect to the table structure within the limit of movement of the carriage 171 along the beam 42.

Suitable means are provided for mounting the ray source 167, Fig. 1, in tiltably adjustable fashion on the carriage 182 so that the ray source may be disposed at any desired inclination and in any desired relative position with respect to the table structure. Readily operable means is also provided for locking the various relatively adjustable part of the ray source support structure in adjusted position, and the entire support structure is provided with weight counterbalance means to permit adjusting movement of the several parts with minimum expenditure of effort.

In order to facilitate manipulation and adjustment of the ray source 167, the mass of the adjustable parts is counterbalanced against a weight 185, Figs. 1 and 22, which may be conveniently suspended on one end of a cable 186. The opposite end of the cable may be anchored, as at 187, on a suitable mounting at one end of the beam structure 42. From said mounting, the cable 186 may extend along the beam structure to the carriage 171, and thence around guide pulleys 188 and 189, Fig. 22, turnably mounted on the carriage and within the channel member 174, the cable 186 extending thence downward to the carriage 182, Fig. 12, and around a pulley 190 turnably mounted therein. From the pulley 190 the cable 186 may pass around pulleys 189' and 188' mounted on the carriage 171 and within the carriage connected end of the channel member 174, said pulleys 188' and 189' corresponding with the guide pulleys 188 and 189. From the pulleys 189' and 188' the cable 186 may extend around a guide pulley 191, Figs. 1 and 22, at the end of the beam structure 42 remote from the cable anchorage 187, for connection with the counterweight 185.

The mass of the channel structure 177 also may be counterbalanced on the channel member 174. To this end, a pulley 192, Figs. 12, 13 and 22, may be mounted at the end of the member 174 between the pulleys 189 and 189'. A cable 193 may be applied around the pulley 192 and its opposite ends connected respectively with the frame structure 177, as at 194, the other end of said cable being connected with a suitable counterweight 195, Fig. 13, supported within the frame member 174 for vertical sliding movement therein, said counterweight, if desired, being provided with rollers adapted to ride on tracks formed longitudinally in the member 174.

The penetrating ray source 167, Fig. 1, may comprise an X-ray generating tube enclosed and supported within a suitable casing 196, preferably of generally cylindrical configuration and having spaced extensions 197 for the accommodation of insulating bushings, through which cables may extend for electrically interconnecting the X-ray tube with a suitable remote source of tube energizing power. The tube casing 196 may be mounted on a support frame 198, Fig. 1, in fashion permitting angular adjustment of the casing on the frame about the medial axis of the casing and of the tube enclosed therein, the ray source provided by the tube being located substantially at said axis. Suitable means may be provided for clamping the casing 196 and the tube enclosed therein in any angularly adjusted position, such means being controlled by a knob or handle 199, Fig. 14, manually operable to clamp the tube and its housing in adjusted position, or to release the same for angular adjusting movement. Index means 200, Fig. 1, may be formed on the housing 196 and the frame 198 to indicate the adjusted angularity of the housing and tube on the support frame 198.

The support frame 198, in turn, may be carried on an elongated frame 201, comprising a cantilever structure providing spaced frame members 202 forming trackways for slidably mounting the frame 198 on the frame 201 for adjusting movement longitudinally of the members 202. Suitable, preferably manually operable means may be provided for securing the mounting frame 198 in adjusted position longitudinally of the frame 201.

At its inner end, the frame 201 may be secured upon a box-like housing 203, Figs. 1 and 14, forming a bearing for mounting the frame for angularly adjustable movement about a stub shaft or pintle 204, Fig. 6, carried on a mounting plate 205, Fig. 14, the axis of the pintle 204 being normal to and substantially in a common plane with the axis of the housing 196. The outer end of the pintle 204 may project outwardly of the housing 203, and index means may be formed on the outwardly projecting end of the pintle and upon the adjacent pintle surrounding portions of the housing for indicating the adjusted angularity of the frame 201 on the pintle. Such index means may comprise an angularity scale 206 on the housing and a cooperating index 207 on the pintle, or vice versa.

Suitable means may be provided for releasably securing the frame 202 and housing 203 in angularly adjusted position on the pintle. Such means may comprise a plate or disk 208, Fig. 6, on the pintle within the housing 203, and a brake arm 209, Fig. 6, mounted, as on a suitable pivot pin, within the housing 203 in position to frictionally engage a surface of the plate 208. This brake arm may be operated by means of a threaded stem 210 connected with the arm and extending thence to and outwardly of the end of the frame 201 remote from the housing 203, the outwardly projecting end of the stem 210 being provided with an operating handle 211, Figs. 1 and 14. By manipulating the handle 211, the brake member 209 may be released from the disk 208 to permit the frame 201 and its carrying housing 203 to be rotated on the pintle 204, or the member 209 may be frictionally engaged with the disk 208 to secure the frame 201 in any desired relative angular position of adjustment on the pintle 204.

The mounting plate 205 is preferably hinged, as at a side edge thereof, to the carriage 182 by means of a hinge 212 mounted on and at one side of the carriage. The hinge 212 preferably incorporates clamping means adapted to be controlled by a manually operable knob or handle 213, so that the mounting plate 205 may be folded flat against the front face of the carriage in position presenting the pintle 204 at right angles to the planes of movement of the structures 171 and 177. Manually operable latch means 214 may be provided on the carriage 182 for securing the plate 205 in such folded position against the front of the carriage. By releasing the latch 214, however, the support plate 205 may be swung on the hinge 212 to any desired angularity with respect to the front of the carriage 182, and may be anchored on the carriage in such angularly adjusted position by operation of the handle 213.

It will be seen from the foregoing that the ray source 167 may be universally adjusted with respect to its associated table structure 31, by adjusting the source housing 196 angularly on the frame 198, by adjusting the frame 198 longitudinally on the cantilever frame 201, by adjusting said cantilever frame angularly on the pintle 204, by adjusting the support plate 205 angularly with respect to the carriage 182, by adjusting the carriage 182 vertically in the structure comprising the relatively extensible channel structures 174 and 177, and by adjusting the carriage 171, on which said extensible structure is mounted, in a direction longitudinally of the beam structure 42.

Means may be provided for latching the frame 33 against, and for releasing the same for, movement along the chordal members 64 and 65. To this end, the track 136 may be provided with a rack bar 136', Fig. 30, like the bar 123, extending longitudinally of the chordal member 65. A solenoid actuated detent, like the detent 124, may be mounted on the frame 33, in position to move adjacent the rack bar 136' and latch therewith. The solenoid actuated detent may be controlled by a remote push button switch disposed preferably on the forward end of the frame 36, in position to be closed by the operator of the equipment, in grasping the frame to shift the frame along the chordal members 64 and 65, to thereby release the latch detent from the rack 136'.

It will be seen from the foregoing that the device of the present invention provides a tilting table structure in which the rectangular table is completely unobstructed along the front side and ends thereof, the rear side of the table being also substantially unobstructed through the ring 37, on either side of the adjustable frame 33.

The carriage frame 33 and serialographic equipment mounted thereon also may be parked in unobtrusive position at either end of the table structure, thereby affording substantially unobstructed access to the table top panel from the rear side thereof through the ring 37 and over the top of the chordal beam 64, between the parked carriage frame 33 and the end of the beam 64 remote from the parked carriage frame.

The structure herein illustrated also affords great operational convenience through the provision of relatively simple yet effective means for latching the several adjustable carriage frames in adjusted position, as by means of preferably solenoid actuated latches controlled by conveniently located push button switches adapted for manipulation by an operator of the equipment merely in grasping the various adjustable frame structures to move the same from one position of adjustment to another, operating facility being also afforded by the novel and readily detachable foot rest structure having latch means adapted for actuation by the operator of the equipment in grasping the latching handles of the foot rest structure. The light weight, counterbalanced and universally adjustable support means for the ray source in the housing 196 also affords great operational convenience, since the ray source housing may be adjusted substantially without effort and with great rapidity to any desired position with respect to the table structure, regardless of the adjusted angularity at which it is supported on the ring 37.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

What I claim as new and desire to secure by Letters Patent of the United States is as follows:

1. The combination, in a table structure for use with penetrating rays, of a support, an arcuate frame supported thereon in the vertical plane and arranged for rotation longitudinally of itself about an elevated horizontal axis, a cantilever beam extending forwardly from said frame to support a table at one side of said frame, a table supported above said beam and below said axis, a carriage movable along said table and carrying a ray source beneath the table and a support for a ray sensitive screen above the table, means for moving said screen into proximity to said axis and for securing said screen in that location, means to latch the table and carriage to fixed position relative to said frame and to rotate said frame, table, and carriage as a unit about said axis, said screen being in such close relation to said axis that the operator may continuously observe an image on said screen near said axis produced by rays from said source while said table and carriage are rotated through a wide angle in either direction about said axis without, himself, changing position along the table.

2. The combination, in a penetrating ray table structure, an arcuate frame supported thereon for movement longitudinally of itself in a vertical plane about an elevated horizontal axis, power means to drive said arcuate frame about said axis, a table supported on one side of said frame and projecting therefrom, means to support, from said frame and for rotation with it, a ray source beneath said table and a ray sensitive material above the table, both in alinement through the table, means for maintaining said ray sensitive material in a position coinciding substantially with said axis, whereby an observer may, from a single position along said table, observe with substantially equal closeness an image produced on said screen by rays from said source received through an object on said table during movement of the table, source, and object through a large angle in either direction about said axis.

3. A table structure comprising support means including an arcuate track member, means for mounting said track member for turning movement in a vertical plane about a central elevated horizontal axis, a chordal beam secured on said track member, a table frame including an elongated table top panel supported on said frame in position presenting said panel in a plane substantially parallel to said chordal beam, a carriage movable longitudinally of said chordal beam, means for mounting a penetrating ray source on said carriage beneath said panel and a layer of ray sensitive material on said carriage above said panel in alinement with said source and in proximity to said axis to permit viewing thereof by the operator from a single position along the table while said track member and table are rotated through a large angle in either direction from a central position about said axis, means to latch said carriage in adjusted position longitudinally of said chordal beam, and manually operable means to release said latch means, said manually operable means being mounted on said frame in convenient position for operation in grasping the carriage to shift same on said chordal beam.

4. A table structure comprising a table frame including a table top panel, a carriage and means to support the same for movement longitudinally of the table frame, a ray source support frame on said carriage and shiftable thereon transversely of said panel for supporting a penetrating ray source therebeneath, a sensitive material support frame on said carriage and shiftable thereon transversely of said panel for mounting ray sensitive material above the panel, and means drivingly connecting said support frames for movement in unison transversely of the panel, including means operable to lock the ray source support frame against movement on the carriage and to release the sensitive material support frame for continued movement on the carriage to inoperative retracted position, when said frames have reached a predetermined position of displacement in one direction on the carriage laterally of the panel.

5. A table structure comprising a table frame including a table top panel, a carriage and means to support the same for movement longitudinally of the table frame, a ray source support frame on said carriage and shiftable thereon transversely of said panel for supporting a penetrating ray source therebeneath, a sensitive material support frame on said carriage and shiftable thereon transversely of said panel for mounting ray sensitive material above the panel, and means drivingly connecting said support frames for movement in unison transversely of the panel, including means operable to lock the ray source support frame against movement on the carriage and to release the sensitive material support frame for continued movement on the carriage to inoperative retracted position, when said frames have reached a predetermined position of displacement in one direction on the carriage laterally of the panel, a cassette movable longitudinally of and beneath said table when said frames are in said locked position to support material sensitive to rays received from above said table, and means to latch said cassette against movement longitudinally of said panel.

6. A table structure comprising a table frame including an elongated top panel, a carriage, means to support said carriage for movement longitudinally of said panel, a ray source support frame on said carriage and shiftable thereon transversely of said panel to support a ray source there beneath, a sensitive material support frame on said carriage and shiftable thereon transversely of said panel for mounting ray sensitive material above the panel, means drivingly connecting said support frames for movement in unison transversely of the panel, said means comprising means for locking said ray source support frame against movement when both frames are in retracted position, and means responsive to movement of said sensitive material support frame from retracted position drivingly to engage said ray source support frame driving means and operating said ray source support frame to a position alined with said sensitive material support frame transversely of said table.

7. A table structure comprising a table top panel, a carriage, means to support said carriage for movement longitudinally of said panel, a ray source support frame on said carriage and shiftable thereon transversely of said panel for supporting a penetrating ray source thereberneath, a sensitive material support frame on said carriage and shiftable thereon transversely of said panel for mounting ray sensitive material above the panel, means drivingly connecting said support frames for movement in unison transversely of the panel, said last means comprising an element forming a driving pinion and an adjacent locking portion providing a flat locking surface, said element being drivingly connected to turn in response to movement of a said support frame on the carriage transversely of the table top panel, and a cooperating element connected with the other of said support frames and providing a rack bar portion in position drivingly to engage said pinion and a locking slide portion adapted to engage said flat locking surface as the pinion reaches and disengages from an end of said rack bar portion, thereby to lock one of said frames against movement on the carriage and to release the other frame for continued movement on the carriage to inoperative retracted position, when said frames have reached a predetermined position of displacement in one direction on the carriage laterally of the panel.

References Cited in the file of this patent

UNITED STATES PATENTS

| | | |
|---|---|---|
| 2,038,327 | Wantz | Apr. 21, 1936 |
| 2,103,693 | Pohl | Dec. 28, 1937 |
| 2,695,362 | Gerneth | Nov. 23, 1954 |
| 2,822,477 | Kizaur | Feb. 4, 1958 |